US008424198B2

(12) United States Patent

McCaskey

(10) Patent No.: US 8,424,198 B2

(45) Date of Patent: Apr. 23, 2013

(54) WIRE POSITIONING TOOL

(75) Inventor: Charles McCaskey, Chardon, OH (US)

(73) Assignee: Charles McCaskey, Chardon, OH (US)

(*) Notice: Subject to any disclaimer, the term of this patent is extended or adjusted under 35 U.S.C. 154(b) by 309 days.

(21) Appl. No.: 12/907,166

(22) Filed: Oct. 19, 2010

(65) Prior Publication Data

US 2012/0090170 A1 Apr. 19, 2012

(51) Int. Cl.

*B23P 19/00* (2006.01)

*H01R 43/00* (2006.01)

(52) U.S. Cl.

USPC ................ 29/755; 29/566.4; 29/749; 29/750; 29/758

(58) Field of Classification Search .................... 29/755, 29/566.3, 566.4, 749, 750, 751, 753, 758

See application file for complete search history.

(56) References Cited

U.S. PATENT DOCUMENTS

| | | | | |
|---|---|---|---|---|
| 3,628,202 | A | 12/1971 | Brown et al. | |
| 3,708,852 | A | 1/1973 | Mason | |
| 3,742,571 | A | 7/1973 | Brehm | |
| 3,758,935 | A | 9/1973 | Long et al. | |
| 3,886,641 | A | 6/1975 | Davis | |
| 3,898,724 | A | 8/1975 | Conorich | |
| 4,180,904 | A | 1/1980 | Nijman | |
| 4,241,496 | A * | 12/1980 | Gregson | 29/751 |
| 4,349,944 | A | 9/1982 | Fickes | |
| 4,567,639 | A | 2/1986 | Fasano | |
| 4,642,874 | A | 2/1987 | Litehizer, Jr. | |
| 4,656,725 | A | 4/1987 | Knickerbocker | |
| 5,561,898 | A | 10/1996 | White et al. | |
| 5,628,105 | A * | 5/1997 | Fallandy et al. | 29/566.4 |
| 5,836,069 | A | 11/1998 | Fallandy et al. | |
| 6,401,325 | B1 | 6/2002 | Fidtje | |
| 6,729,902 | B2 | 5/2004 | Martich | |
| 7,073,245 | B2 | 7/2006 | Alexander et al. | |
| 7,103,968 | B2 | 9/2006 | Karrasch | |
| 2010/0031492 | A1 | 2/2010 | Lee et al. | |

* cited by examiner

*Primary Examiner* — Thiem Phan

(74) *Attorney, Agent, or Firm* — Eschweiler & Associates, LLC

(57) ABSTRACT

A wire positioning tool is provided having a handle and a positioning member operably coupled to the handle. The positioning member has a plurality of notches, and a wire retention member is retractably slidingly coupled to the handle between a load position and an unload position. The wire retention member has a plurality of wire engagement slots, wherein in the load position, the wire retention member selectively secures each of the plurality of wires in a respective one of the plurality of wire engagement slots. When placed in the unload position, the wire retention member is retracted with respect to the positioning member, therein transferring the plurality of wires from the wire retention member to a plurality of terminals of a termination block via the plurality of notches in the positioning member. The handle further has a cable guidance member for engaging a cable comprising the plurality of wires.

16 Claims, 9 Drawing Sheets

WIRE POSITIONING TOOL

FIELD OF THE INVENTION

The present invention relates generally to network and telecommunications installation tools, and more particularly, to a tool for concurrently positioning a plurality of wires of a twisted pair cable in a termination block for subsequent cutting and seating.

BACKGROUND

In the telecommunications cabling industry, it is a common task to route voice and data telecommunication wires, such as twisted pair cables, between various termination points throughout a building or area, wherein the cables connect one terminal to another. Standard commercially-available Insulation Displacement Connector (IDC) type bifurcated terminals, also called terminal blocks, such as the commonly used 110-style block, are typically used to provide an interconnection between electronic equipment and work area outlets for electrically conductive data transfer media (hereinafter also referred to as “cable”), such as unshielded twisted pair cable (“UTP”). UTP is a popular and widely used type of data transfer media for either voice or data communications, and is commonly used for Local Area Networks (“LANs”) and other in-building voice and data communications applications.

The terminal block provides an electrical joining or connection of a cable to other devices, hardware, or cables, wherein the terminal block acts as a transfer point. The terminal block comprises a dielectric block having a plurality of electrical termination locations defined therein (hereinafter referred to as “terminals”), wherein the terminals have engagements for securing individual signal-carrying elements (hereinafter referred to as “wires”) of one or more cables. Conventional terminal blocks are often integrated into a what is known as a “patch panel”, wherein the terminal block facilitates an electrical connection between the terminated cable and another device or piece of hardware connected to the patch panel by a second cable or “patch cord”. Once a cable is terminated or electrically connected to the patch panel via the electrical connection of the wires to the terminal block, the patch panel generally permits interchangeable interconnection of various devices and cables, thus simplifying cabling to the individual devices.

Conventionally, the individual wires of the cable are placed by hand in individual terminals or blades of a terminal block, and an impact tool or “punch-down” tool is subsequently utilized to cut and seat the individual wires in the terminal blocks. A variety of impact tools are available to installers within the telecommunications industry, wherein the impact tools are configured for seating and cutting the individual wires in the termination blocks. A typical impact tool comprises a handle and a head utilized in cutting and seating individual wires positioned in a terminal. An axially translatable hammer is provided within the handle, wherein the hammer is typically biased by a compression spring to strike the head. As an installer grips the handle and pushes it against a wire already individually positioned in the terminal, a hammer release element within the handle is moved into alignment with the hammer travel path, such that the compression spring releases its energy, thus causing the hammer to rapidly impact the cutting head, therein cutting the end of the wire and seating the wire in the terminal.

Such use of the aforementioned impact tools is common; however, the individual wires need to be already placed in the terminals into which they are to be seated. In a typical cable having multiple twisted-pair wires, for example, the installer will manually place the individual wires in their respective terminals by hand, and then follow the placement with the cutting and seating provided by the impact tool. Often times, however, the terminals are located in a terminal block that is difficult to reach due to other equipment (e.g., routers, switches, etc.) being in the way, or the terminal block is not the line of sight from the viewpoint of the installer. As a consequence, it is often time-consuming and labor-intensive for the installer to properly position the individual wires in such a limited environment, thereby increasing the cost of installation of telecommunications or network equipment. Further, it is often cumbersome to manually position more than one wire at a time prior to cutting and seating.

SUMMARY OF THE INVENTION

The present invention overcomes the limitations of the prior art and provides inventive an apparatus and method for installing telecommunications wiring. In particular, the present invention provides a tool for pre-positioning a plurality of wires in a terminal block prior to a cutting and seating thereof, wherein the tool retains the plurality wires for positioning within the terminal block. Upon successful positioning, the tool is removed and the individual wires may be cut and seated using a conventional impact tool.

In accordance with one exemplary aspect of the present invention, a wire positioning tool is provided, wherein the wire positioning tool has a handle and a positioning member operably coupled to the handle. The positioning member, for example, comprises a plurality of notches defined therein, wherein the positioning member is generally fixed with respect to the handle.

A wire retention member is further provided, wherein the wire retention member is retractably coupled to the handle and configured to slidingly translate with respect to the positioning member between a load position and an unload position. The wire retention member has a plurality of wire engagement slots, and wherein in the load position, the wire retention member is configured to selectively secure each of the plurality of wires thereto in a respective one of the plurality of wire engagement slots. For example, the wire retention member comprises a binding member positioned in each of the wire engagement slots, respectively, wherein the binding member is configured to selectively retain the respective wire within the wire engagement slot, According to one example, the binding member comprises a resilient member positioned on or within one or more sidewalls of each of the wire engagement slots. The resilient member may comprise rubber, a metallic or synthetic spring, or other resilient material.

When placed in the unload position, the wire retention member is retracted with respect to the positioning member, therein transferring the plurality of wires from the wire retention member via the plurality of notches in the positioning member. The plurality of wires are thus transferred to a plurality of terminals of a termination block by the plurality of notches in the positioning member, wherein the positioning member is configured to position each of the plurality of wires in a respective terminal.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1A:
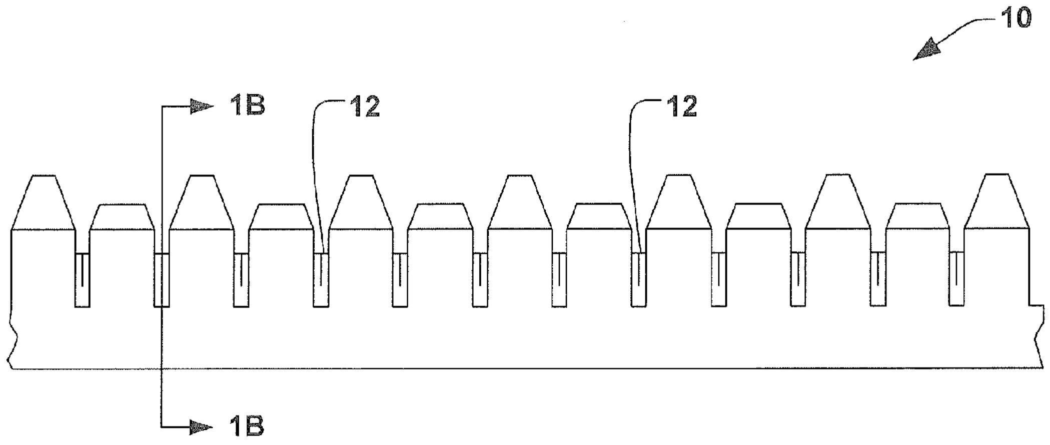
FIGS. 1A and 1B respectively illustrate front and side views a conventional terminal block according to one example.

The present invention is directed generally toward tools for use in the telecommunications industry, and more particularly, to a tool configured to selectively retain individual wires of a twisted pair cable prior to termination at a terminal block. Accordingly, the present invention will now be described with reference to the drawings, wherein like reference numerals may be used to refer to like elements throughout. It should be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details.

Figure 1B:
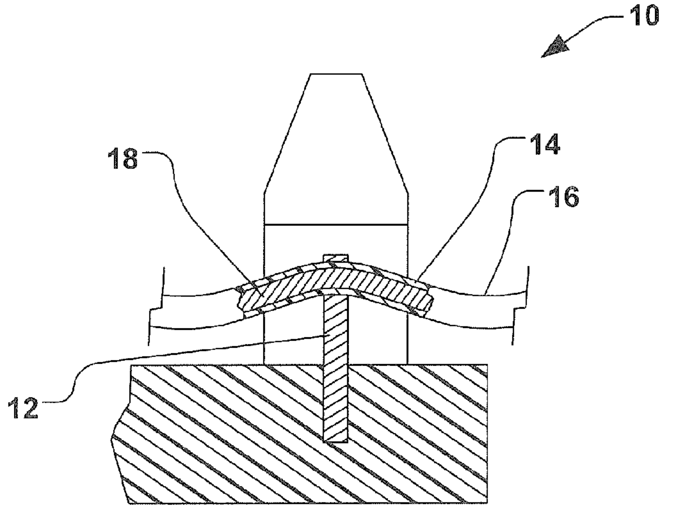

FIGS. 1A and 1B illustrate an exemplary terminal architecture or punch block 10 (also called a punchdown block, punchblock, termination block, or quick-connect block) often used in telecommunications and network communications arenas. The punch block 10, for example, comprises one or more sets of Insulation Displacement Connector (IDC) type bifurcated terminals 12, the construction of which will be understood by one of ordinary skill in the art. The IDC terminals 12, for example, are configured to cut through an insulation coating 14 of a wire 16, as illustrated in FIG. 1B, when the wire is "punched down" or forcibly connected to the terminal by a conventional "punch down" tool (not shown), therein generally fixing the wire in position and maintaining electrical contact between a conductor 18 of the wire and the IDC terminal 12, as will be understood by one of ordinary skill in the art.

The punch block 10 and associated IDC terminals 12, for example, are integrated into a patch panel (not shown) configured to selectively connect or "patch" various devices (e.g., a network router, switch, etc.—not shown) thereto, as will be understood by one of ordinary skill in the art. Accordingly, the punch block 10 of FIGS. 1A and 1B is configured to accept a plurality of wires 16 (e.g., a plurality of twisted-pair wires) defining a cable (e.g., a cat-5 or cat-6 cable), wherein the punch block 10 electrically connects the plurality of wires to the respective device (not shown). It should be noted that while specific devices may be named or described herein, the present disclosure is not limited to such devices, and the present invention is adaptable and applicable to any punch block 10.

Figure 2:
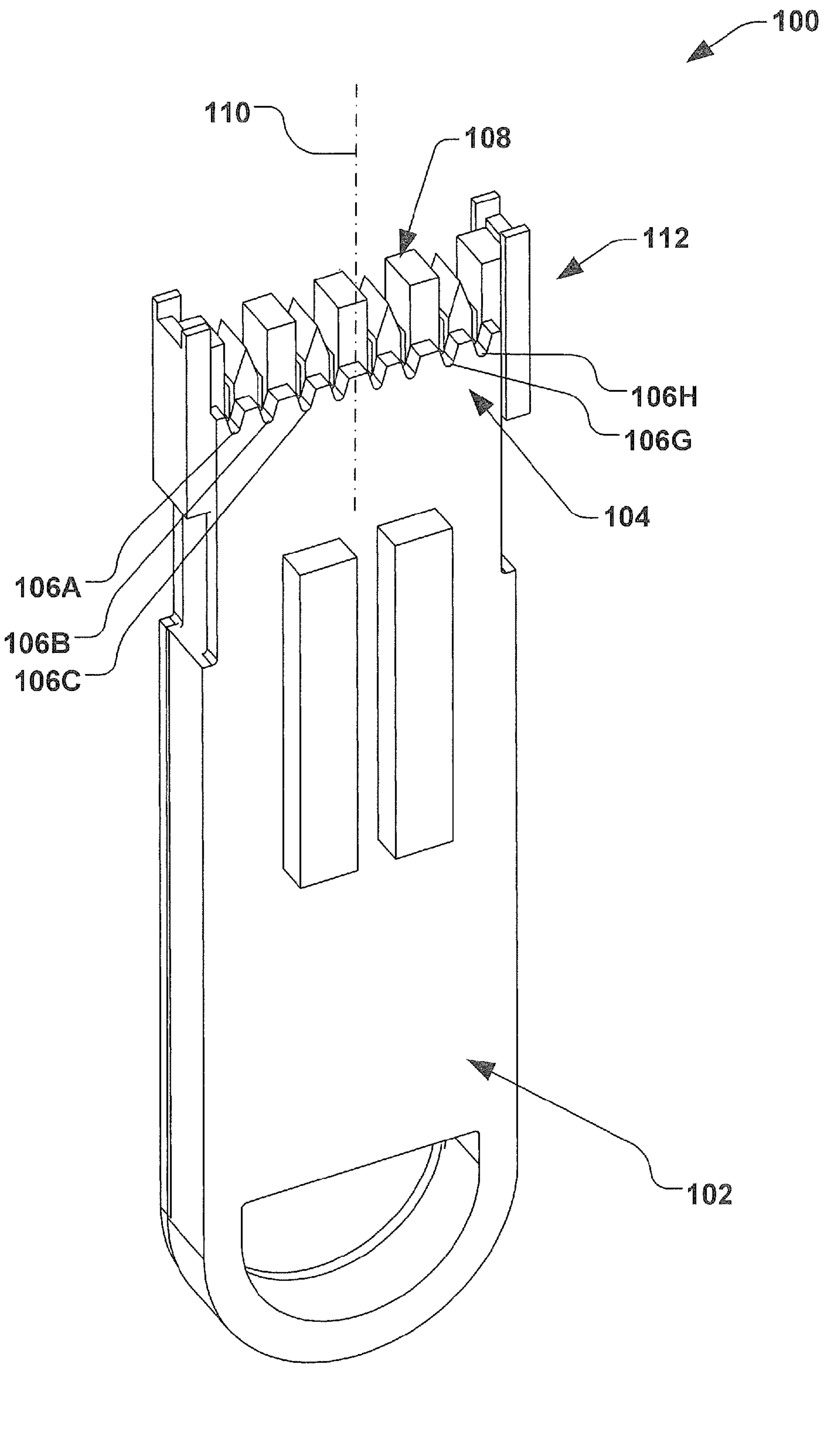
FIG. 2 illustrates a wire positioning tool according to one exemplary aspect of the present invention.

In accordance with the present disclosure, FIG. 2 illustrates an exemplary wire positioning tool 100 for positioning, but not seating, a plurality of individual wires in a terminal architecture or punch block, such as the punch block 10 of FIG. 1A. The wire positioning tool 100 of FIG. 2, for example, is thus configured to selectively concurrently place, but not electrically connect or "punch down", a plurality of individual wires in a plurality terminal contacts, as will be discussed in further detail infra. It should be noted that while the positioning tool 100 illustrated in FIG. 2 is configured to position eight wires, the present invention is not to be limited to any particular number of wires. In one particular example, the terminal architecture comprises a Cat-5 IDC 110-style terminal block 10 illustrated in FIG. 1, such as those often utilized in network telecommunications. The terminal block 10 of the present example thus comprises a plurality of sets of eight bifurcated terminal contacts or terminals 12 electrically isolated from one another by alternating insulative extensions 18 per block, as will be understood by one of ordinary skill in the art.

The wire positioning tool 100 will be further described with reference to various examples in FIGS. 2-12. In FIG. 2, for example, the wire positioning tool 100 is illustrated comprising a handle 102 and a positioning member 104 operably coupled thereto. The positioning member 104 in the present example is integral to the handle 102, wherein the handle is generally hollow. Alternatively, the positioning member 104 is an individual member that is fixedly coupled to the handle 102. In accordance with the present example, the positioning member 104 comprises a plurality of notches 106A-106H defined therein. The number of notches 106 in the positioning member 104, for example, can be varied for various positioning tools 100 in order to conform to a configuration of a particular terminal architecture and/or cable configuration.

A wire retention member 108 is retractably coupled to the handle 102, wherein the wire retention member is configured to slidingly translate along an axis 110 with respect to the positioning member 104. The wire retention member 108 is thus configured to linearly translate between a load position 112 illustrated in FIGS. 2, 5, 7, 9, and 12, and an unload position 114 illustrated in FIGS. 8 and 10, as will be described in further detail infra.

Figure 3:
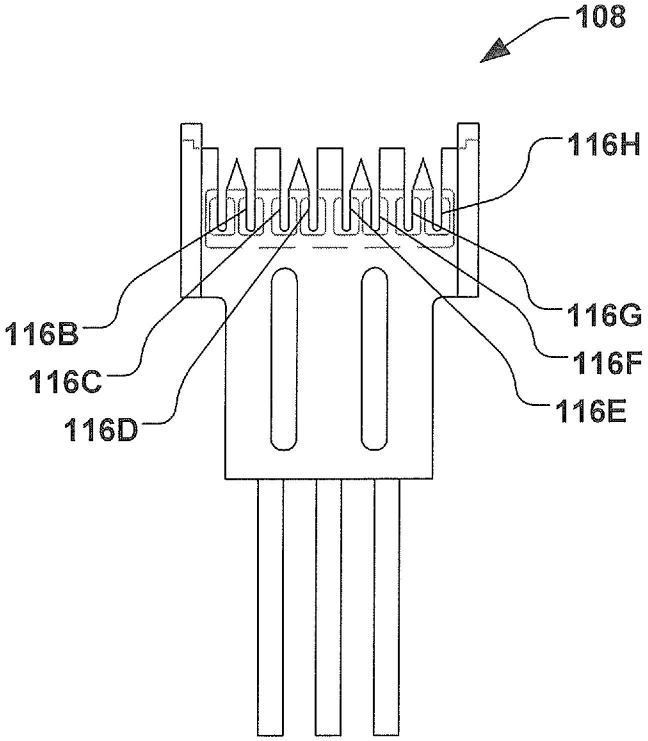
FIG. 3 illustrates a wire retention member according to another exemplary aspect of the invention.

One exemplary wire retention member 108 is illustrated in FIG. 3, wherein the wire retention member is shown to comprise a plurality of wire engagement slots 116A-116H, the number and configuration of which is associated with the plurality of notches 106A-106H of FIG. 2. In accordance with one example, the wire retention member 108 of FIG. 3 comprises one or more wire binding members 118 associated with each of the wire engagement slots 116A-116H, respectively, as illustrated in greater detail in FIG. 4. In one example, the wire binding member 118 associated with each wire engagement slot 116A-116H comprises one or more generally resilient members 120 associated with one or more sidewalls 122 of each respective wire engagement slot. The one or more wire binding members 118 associated with each wire engagement slot 116A-116H are configured to selectively secure a wire (e.g., the wire 16 of FIG. 1) in the respective wire engagement slot. The one or more generally resilient members 120, for example, comprise a rubber or other resilient material or compound positioned in a pocket 124 of the respective sidewall 122. Alternatively, the one or more generally resilient members 120 comprise one or more metallic or synthetic springs (not shown) associated with the respective sidewall 122. In accordance with yet another example, the one or more binding members 118 comprise a narrowing of a width 126 of the respective wire engagement slot 116A-116H, wherein the narrowed width selectively secures the respective wire via friction.

In accordance with another exemplary aspect of the invention, the wire retention member 108 comprises one or more location members 128 positioned at one or more ends 130 of the wire retention member, wherein the one or more location members are configured to mate with a location feature of the termination block. For example, the one or more location members 128 are configured to mate with one or more insulative extensions 18 of FIG. 1, therein providing the ability to properly position the wire retention member on the terminal block 10.

Figure 4:
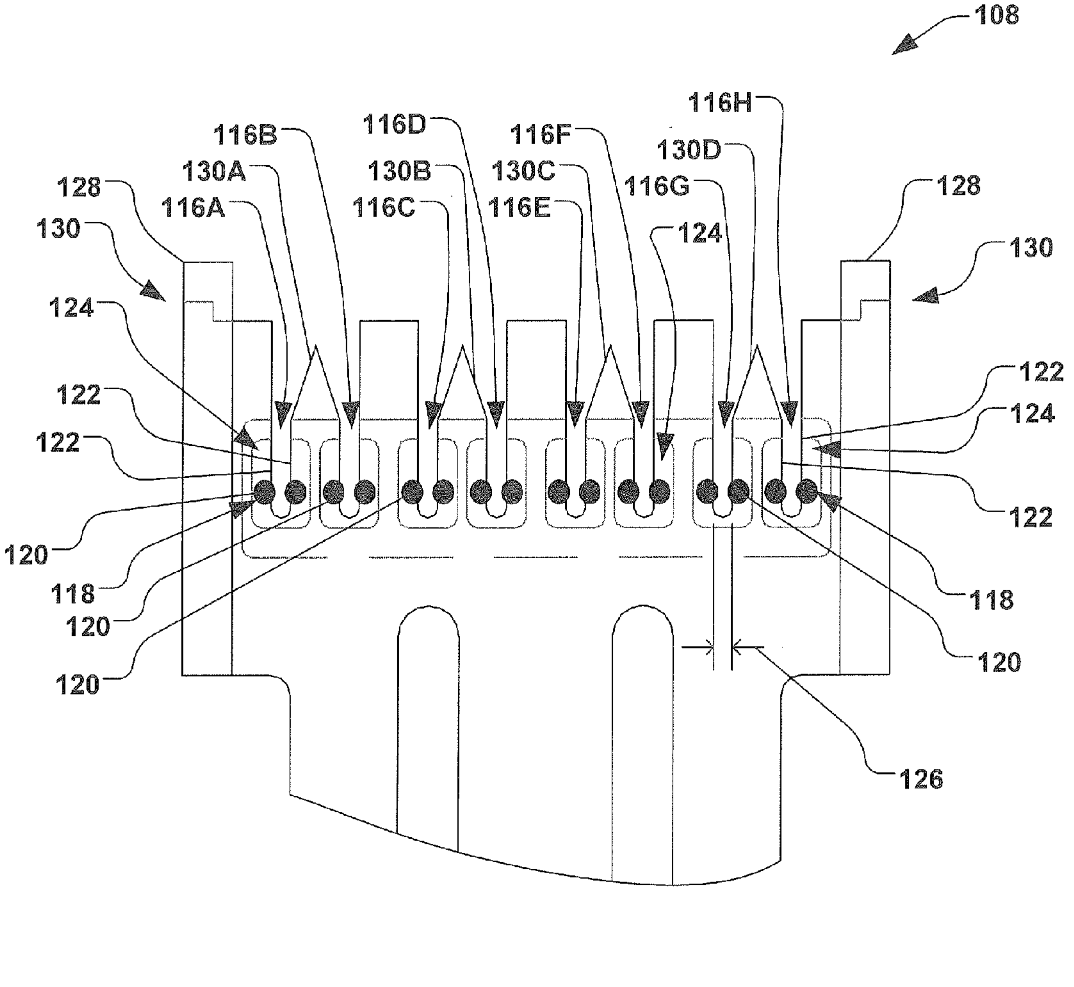
FIG. 4 illustrates an enlarged view of an exemplary wire retention member according to yet another exemplary aspect of the invention.

According to yet another exemplary aspect of the invention, the plurality of wire engagement slots 116A-116H of FIG. 4 are grouped in pairs, wherein the wire retention member 108 comprises a beveled alignment member 130 associated with each pair of wire engagement slots. As illustrated in greater detail in FIG. 5, each beveled alignment member 130, for example, is configured to guide a positioning or insertion of a wire 132 of a cable 136 into the respective wire engagement slots 116A-116H associated with the beveled alignment member. For example, beveled alignment member 130A is associated with wire engagement slots 116A and 116B, wherein the beveled alignment member 130A is configured to guide wires 132A and 132B (therein defining a first pair 134A of wires) into the wire engagement slots 116A and 116B. Beveled alignment member 130B is associated with wire engagement slots 116C and 116D, wherein the beveled alignment member 130B is configured to guide wires 132C and 132D (therein defining a second pair 134B of wires) into the wire engagement slots 116C and 116D, and so on. A separating member 138, for example, is further disposed between each beveled alignment member 130, therein differentiating each pair of wire engagement slots 116, and each pair 134A-134D of wires 132A-132H.

Figure 5:
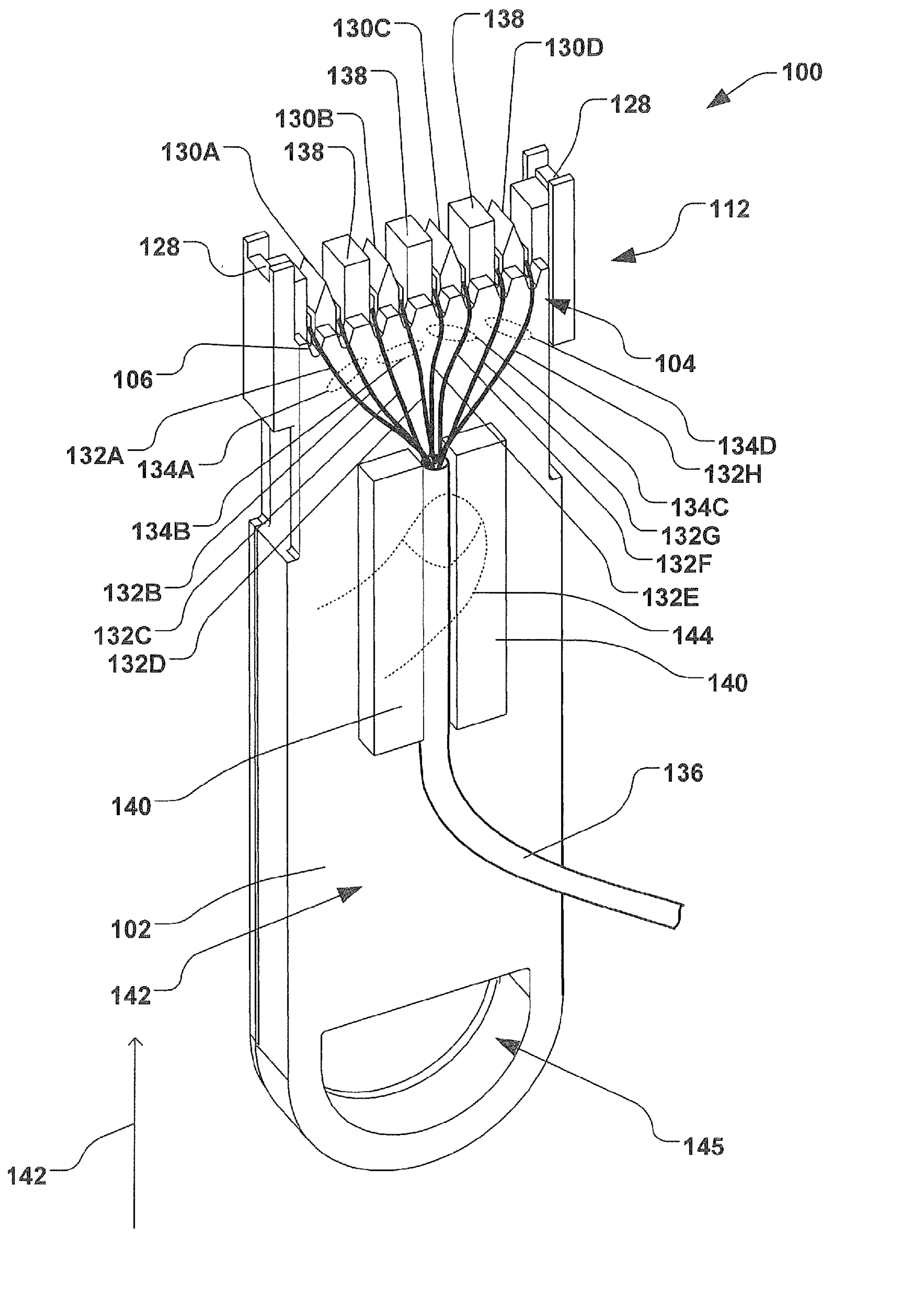
FIG. 5 illustrates a wire positioning tool holding a plurality of twisted pair wires of a cable according to another exemplary aspect of the present invention.

Another exemplary aspect is further illustrated in FIG. 5, wherein the handle 102 comprises one or more cable guidance members 140 extending along a length of an outer portion 142 of the handle 102. The one or more cable guidance members 140, for example, comprise one or more of grooves, blocks, raised or recessed surfaces, or other mechanical features defined in or coupled to the outer portion 142 of the handle. The one or more cable guidance members 140, for example, provide for a stabilization and/or holding of the cable 136 buy an installer 144, as will be discussed further hereafter. The one or more cable guidance members 140, for example, further limit a deleterious untwisting of the plurality of pairs 134 of wires 132 beyond a predetermined length. Extensive untwisting of the pairs 134 of wires 132 can have negative implications to signal strength provided by the respective pairs of wires.

Figure 6:
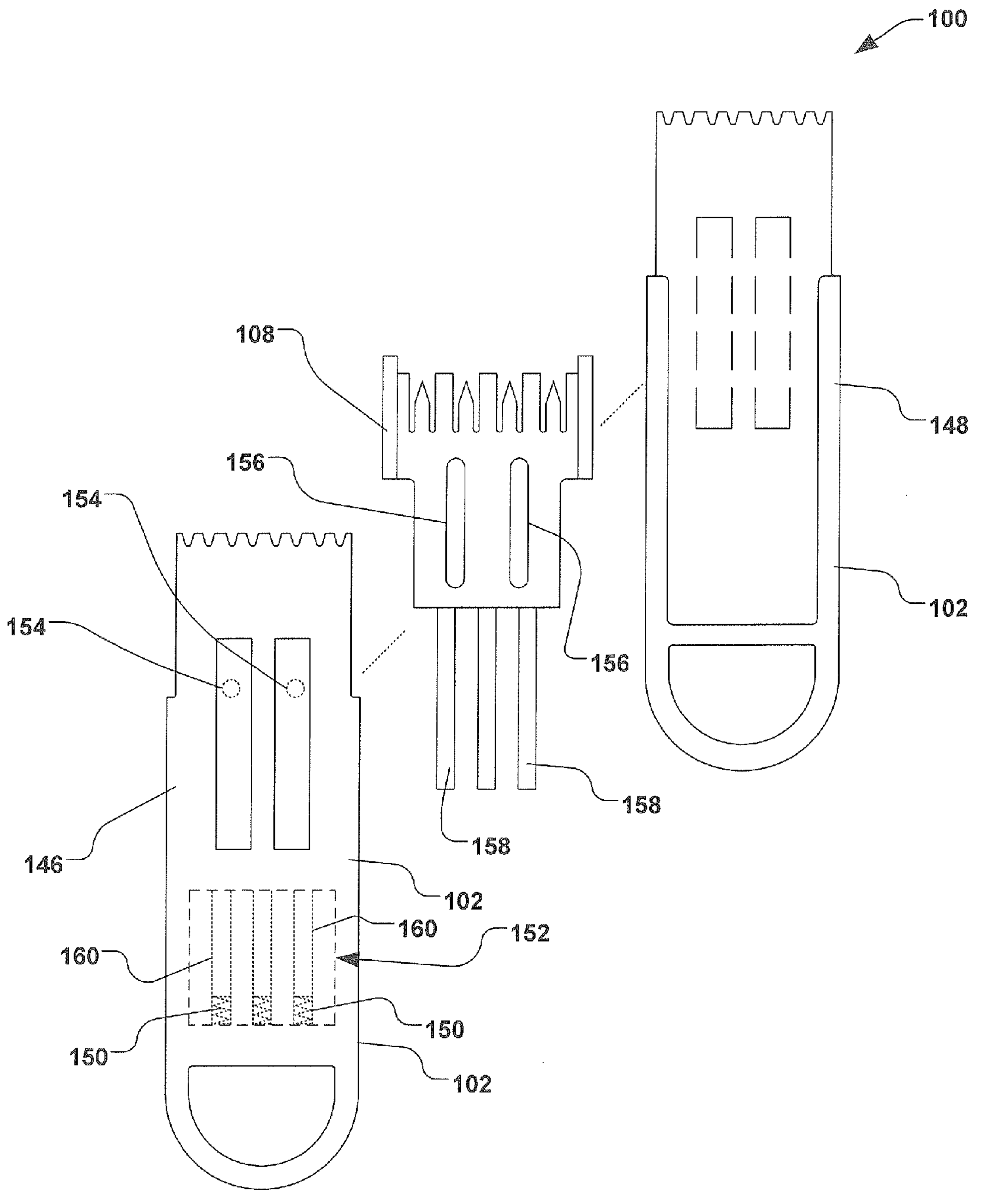
FIG. 6 illustrates an exploded plan view of an exemplary wire positioning tool in accordance with a further aspect of the invention.

According to another example, the handle 102 comprises an opening 145, wherein the opening is configured to aid the installer 144 during handling of the tool 100. For example, the opening 145 is configured as a finger or thumb hold, such that the installer is provided additional leverage or maneuverability in tight spaces. The opening 145 alternatively serves as a securement region, such that the installer can releasably attach the tool 100 to an object, such as a tool belt, cable, or other object for stowage. In accordance with another exemplary aspect, the handle 102 comprises a first half 146 and a second half 148, as illustrated in the in the exploded view of FIG. 6, wherein the tool 100 is formed by sandwiching the wire retention member 108 between the first half and second half of the handle. The first half 146 and the second half 148 of the handle 102, for example, are fixedly or removably coupled to one another by glue, screws, thermal bonding, mating fasteners molded into the first and/or second half, or any other fastening mechanism, as will be appreciated by one of ordinary skill in the art. As illustrated in FIG. 6, the plurality of notches 106 of the positioning member 104 are disposed on opposing sides of the wire retention member 108, wherein the first half 146 and second half 148 of the handle 102 are joined to define the positioning member.

Figure 7:
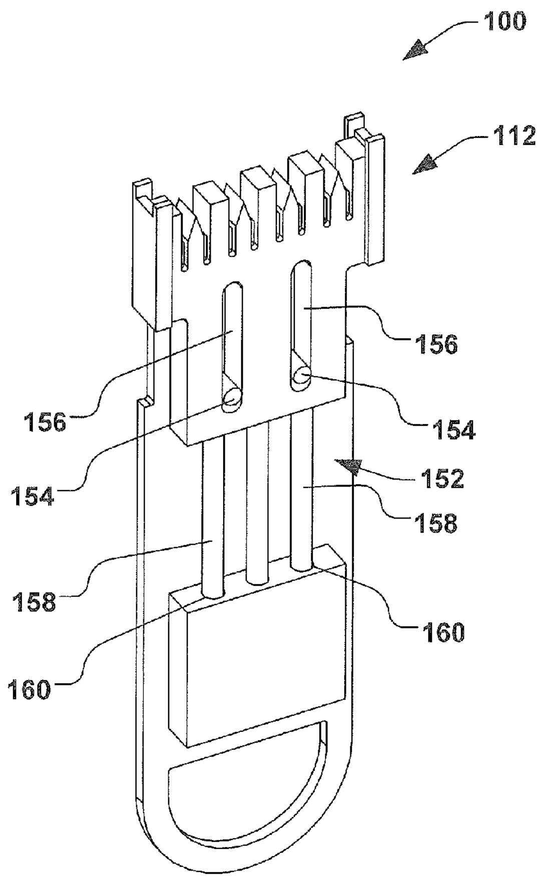
FIG. 7 is a partial cross-section of a wire positioning tool in a load position in accordance with an exemplary aspect of the invention.
Figure 8:
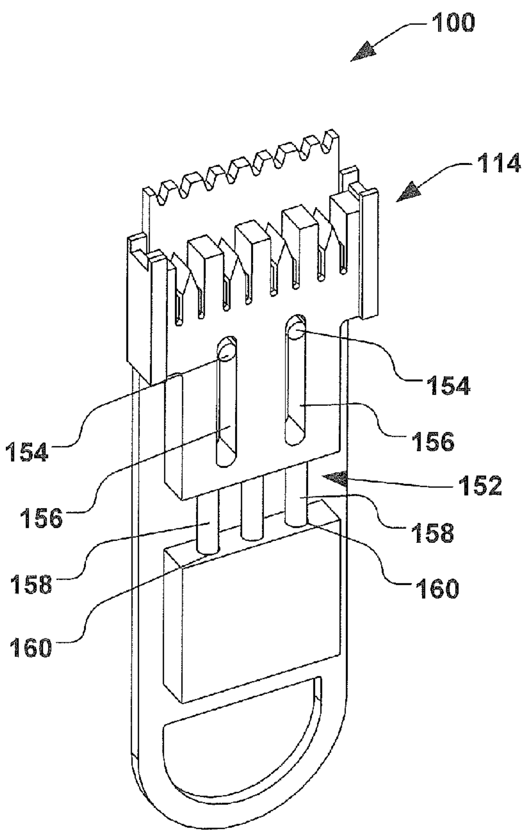
FIG. 8 is a partial cross-section of a wire positioning tool in an unload position in accordance with another exemplary aspect of the invention.

According to another example of the present disclosure, the wire retention member 108 is further biased toward the load position 112 of FIGS. 2, 5, 7, 9, and 12 by one or more springs 150 associated with a translation assembly 152, as illustrated in FIGS. 6-8. The translation assembly 152, as illustrated in FIG. 7, for example, generally maintains a linear non-rotating motion of the wire retention member 108 with respect to the handle 102 by one or more of pins 154, slots 156, rods 158, holes 160, or other linear sliding surfaces associated with one or more of the wire retention member and the handle. The quantity of such pins 154, slots 156, rods 158, holes 160 or other features limiting the translation of the retention member is customizable based on the desired manufacturing method and/or materials used in the construction of the tool 100.

Figure 9:
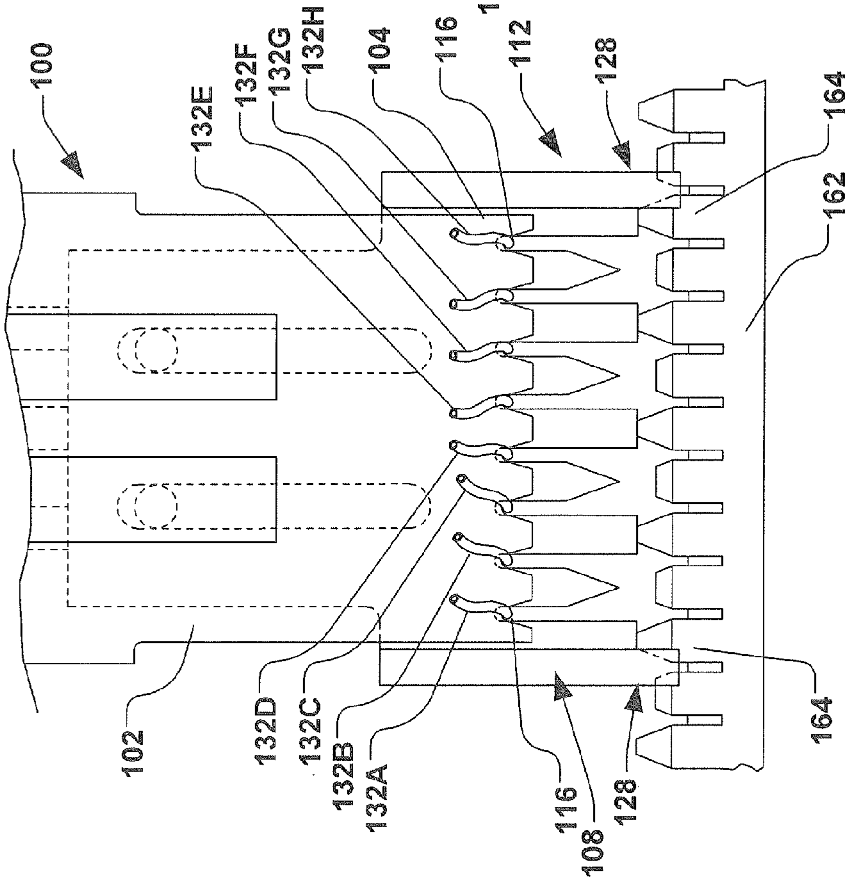
FIG. 9 illustrates a wire positioning tool placed on a termination block according to still another exemplary aspect of the invention.

In accordance with another aspect of the present disclosure, when the wire retention member 108 is in the load position 112, as again illustrated in FIG. 5, the wire retention member is configured to selectively secure each of the plurality of wires 132A-132H thereto in the respective wire engagement slots 116, as again shown in FIG. 4. When the plurality of wires 132 are secured in the respective plurality of wire engagement slots 116, the tool 100 is placed into position on a termination block 162, as illustrated in FIG. 9, wherein the one or more location members 128 are configured to mate with the one or more insulative extensions 164 for accurate placement of the tool, even when the termination block is not in the line of sight of the installer.

Figure 10:
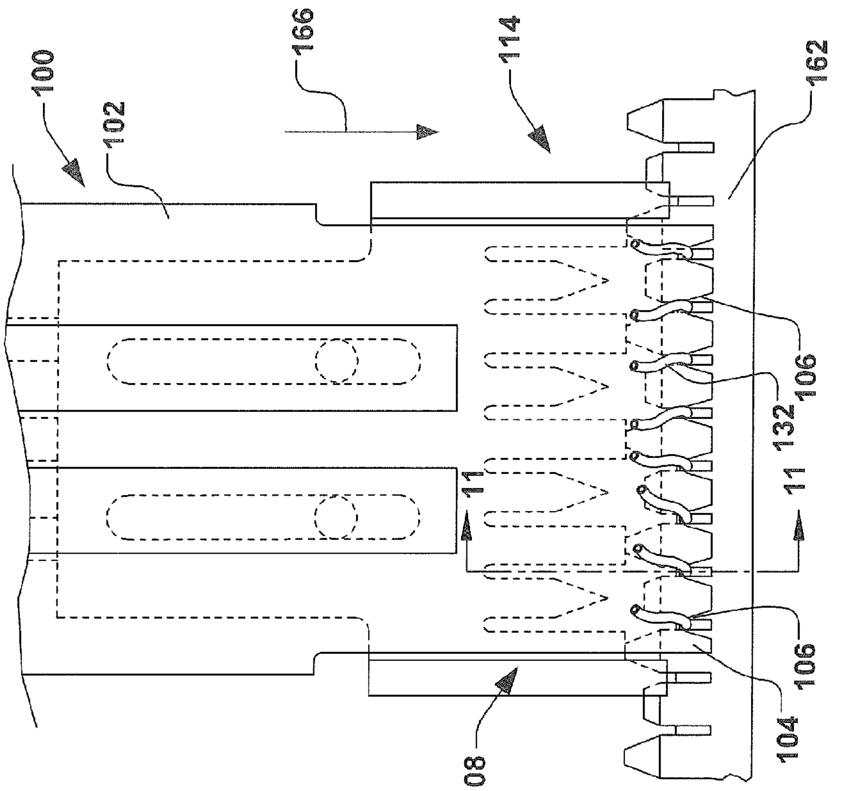
FIG. 10 illustrates the wire positioning tool of FIG. 9 placing a plurality of wires on a termination block according to another exemplary aspect of the invention.
Figure 11:
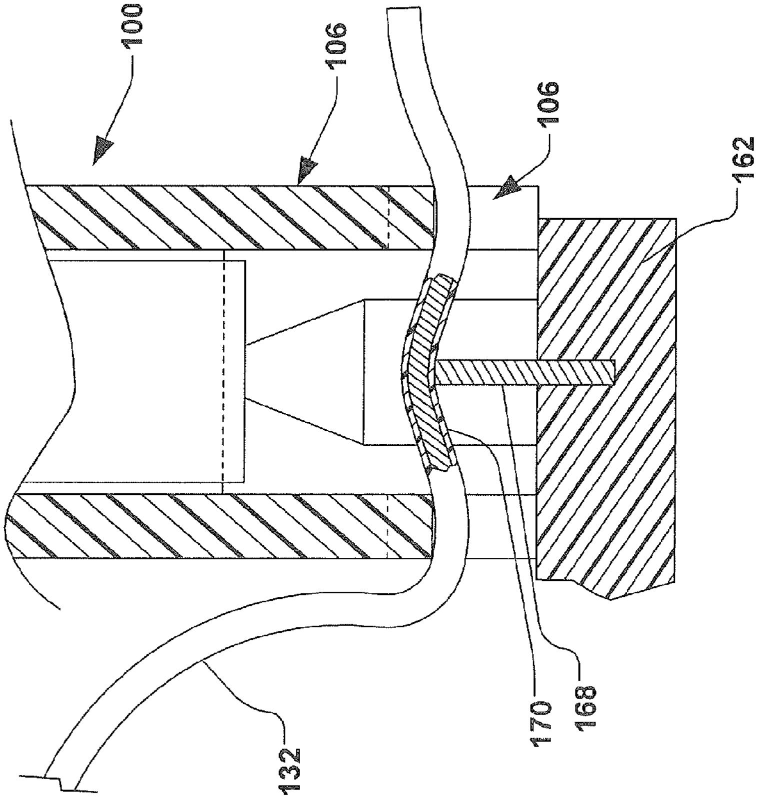
FIG. 11 illustrates a cross section of the wire positioning tool of FIG. 10 placing a plurality of wires on the termination block.
Figure 12:
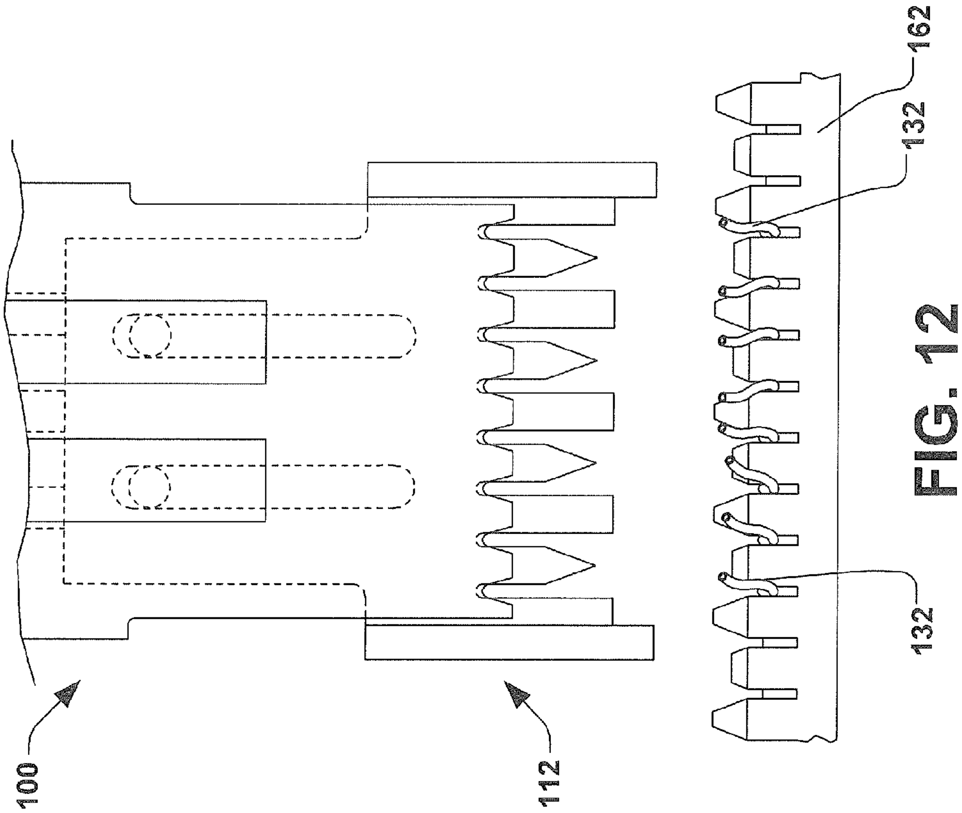
FIG. 12 illustrates the wire positioning tool of FIGS. 9-11 after placing a plurality of wires on a termination block according to another exemplary aspect of the invention.

Once placed in the appropriate position on the termination block 116, the wire retention member 108 is retracted with respect to the positioning member 104, as illustrated in FIG. 10, by pushing the handle 102 in the direction 166 toward the termination block 162, therein transferring the plurality of wires 132 from the wire retention member onto the plurality of terminals, as illustrated in greater detail in FIG. 11. The plurality of notches 106 in the positioning member 104 thus place the plurality of wires 132 onto the plurality of terminals 168. It is noted that the tool 100 of the present invention advantageously places the wires 132 onto the plurality of terminals without generally seating the wires in the terminals 168 (e.g., without piercing the insulation 170 of the wires or cutting the wires). Thus, when the tool 100 is removed from the termination block 162, as illustrated in FIG. 12, the wires 132 are properly positioned in the terminals, and are ready for subsequent cutting and seating of the wires via a conventional cutting and seating tool (not shown).

It should be noted that while exemplary methods are illustrated and/or described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with other systems not illustrated.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A wire positioning tool for positioning a plurality of wires in a termination block, the wire positioning tool comprising:

a handle;

a positioning member operably coupled to the handle, wherein the positioning member comprises a plurality of notches; and a wire retention member retractably coupled to the handle and configured to slidingly translate with respect to the positioning member between a load position and an unload position, wherein the wire retention member comprises a plurality of wire engagement slots, and wherein in the load position, the wire retention member is configured to selectively secure each of the plurality of wires thereto in a respective one of the plurality of wire engagement slots, and wherein in the unload position, the wire retention member is retracted with respect to the positioning member, therein transferring the plurality of wires from the wire retention member to the plurality of notches in the positioning member, and wherein the positioning member is configured to position each of the plurality of wires in a respective terminal of the termination block.

2. The wire positioning tool of claim 1, wherein the positioning member is fixedly coupled to handle.

3. The wire positioning tool of claim 1, wherein the wire retention member comprises a binding member positioned in each of the wire engagement slots, respectively.

4. The wire positioning tool of claim 3, wherein the binding member comprises a resilient member positioned on or within one or more sidewalls of each of the wire engagement slots.

5. The wire positioning tool of claim 4, wherein the resilient member comprises rubber.

6. The wire positioning tool of claim 4, wherein the resilient member comprises a metallic or synthetic spring.

7. The wire positioning tool of claim 3, wherein the binding member comprises a narrowing width of the wire engagement slot.

8. The wire positioning tool of claim 1, wherein the wire retention member comprises one or more location members positioned at one or more ends thereof, wherein the one or more location members are configured to mate with a location feature of the termination block.

9. The wire positioning tool of claim 1, wherein the plurality of notches of the positioning member are disposed on opposing sides of the wire retention member.

10. The wire positioning tool of claim 1, wherein the handle comprises a first half and a second half, wherein the first half and second half generally retain the wire retention member in sliding engagement thereto.

11. The wire positioning tool of claim 10, wherein at least one of the first half and second half comprise one or more cable guidance members extending along a length of an outer portion of the respective first half and/or second half, wherein the one or more cable guidance members are configured to engage a cable comprising the plurality of wires for insertion into the wire retention member.

12. The wire positioning tool of claim 10, wherein the plurality of notches are associated with each of the first half and second half of the handle.

13. The wire positioning tool of claim 1, wherein the plurality of wire engagement slots are grouped in pairs, and wherein the wire retention member comprises a beveled alignment member associated with each pair of wire engagement slots, wherein each beveled alignment member is configured to guide an insertion of a wire into the respective wire engagement slots associated with the beveled alignment member.

14. The wire positioning tool of claim 13, wherein the wire retention member comprises a separating member disposed between each beveled alignment member.

15. The wire positioning tool of claim 1, wherein the handle comprises an opening configured as a finger or thumb hold.

16. A wire positioning tool, comprising:

a generally hollow handle comprising a first half and a second half, wherein at least one of the first half and second half comprise one or more cable guidance members extending along a predetermined length of an outer portion of the respective first half and/or second half, wherein the one or more cable guidance members are configured to engage a cable comprising a plurality of wires;

a positioning member fixedly coupled to the handle, wherein the positioning member comprises a plurality of notches associated with each of the first half and second half of the handle; and a wire retention member retractably coupled to the handle between the first half and second half thereof, wherein the wire retention member is configured to slidingly translate with respect to the positioning member between a load position and an unload position, wherein the wire retention member comprises:

a plurality of wire engagement slots having a binding member respectively positioned within each of the wire engagement slots; and one or more location members positioned at one or more ends of the wire retention member, wherein the one or more location members are configured to mate with a location feature of a termination block, and wherein in the load position, the wire retention member is configured to selectively secure each of the plurality of wires thereto in a respective one of the plurality of wire engagement slots, and wherein in the unload position, the wire retention member is retracted with respect to the positioning member, therein transferring the plurality of wires from the wire retention member to the plurality of notches in the positioning member, and wherein the positioning member is configured to position each of the plurality of wires in a respective terminal of the termination block.

* * * * *